United States Patent [19]
Takase et al.

[11] Patent Number: 5,828,654
[45] Date of Patent: Oct. 27, 1998

[54] ATM CELL POLICING METHOD AND APPARATUS

[75] Inventors: Akihiko Takase, Tokyo; Shigeo Shinada; Mitsuhiro Takano, both of Yokohama; Toshiya Oouchi, Kokubunji; Naoaki Yamanaka, Tokyo; Youichi Sato, Yokohama, all of Japan

[73] Assignees: Hitachi, Ltd.; Nippon Telegraph & Telephone Corp., both of Tokyo, Japan

[21] Appl. No.: 653,475

[22] Filed: May 24, 1996

Related U.S. Application Data

[63] Continuation of Ser. No. 13,398, Feb. 4, 1993, abandoned.

[30] Foreign Application Priority Data

Feb. 6, 1992 [JP] Japan ................................ 4-020974

[51] Int. Cl.$^6$ ........................................................ H04J 3/14
[52] U.S. Cl. ............................ 370/233; 370/235; 370/397
[58] Field of Search ..................................... 370/230, 231, 370/232, 233, 234, 235, 229, 236, 252, 397, 399, 400, 409, 412, 413, 414, 415, 416, 417, 418, 428, 429, 465, 468, 473

[56] References Cited

U.S. PATENT DOCUMENTS

| | | | |
|---|---|---|---|
| 4,896,316 | 1/1990 | Lespagnol et al. | 370/60 |
| 4,984,264 | 1/1991 | Katsube | 370/60 |
| 5,007,043 | 4/1991 | van den Dool et al. | 370/232 |
| 5,050,162 | 9/1991 | Golestani | 370/235 |
| 5,164,938 | 11/1992 | Jurkevich et al. | 370/84 |
| 5,179,556 | 1/1993 | Turner | 370/84 |
| 5,200,952 | 4/1993 | Bernstein et al. | 370/79 |
| 5,253,247 | 10/1993 | Hirose et al. | 370/54 |

OTHER PUBLICATIONS

*International Zurick Seminar on Digital Communications,* "The Policing Function in an ATM Network", by F. Denissen, et al., Mar. 1990, New York, New York.

IEEE Networks: The Magazine of Computer Communications, "Resource Management and Dimensioning in ATM Networks", by G. Gallassi, et al., vol. 4, No. 3, May 1990, New York, New York.

*Philips Telecommunications Review,* "ATM Traffic Capacity Modelling", by J. Van Der Rhee, et al., vol. 48, No. 2, Jun. 1990, Hilversum NL.

*Primary Examiner*—Huy D. Vu
*Attorney, Agent, or Firm*—Antonelli, Terry, Stout & Kraus, LLP

[57] ABSTRACT

In an input cell policing method in a network of an asynchronous transfer mode, according to information contained in a header field of each input cell, a group to which the cell belongs is identified. For each group, there are set a plurality of time frames having a predetermined length and mutually different phases to count the number of input cells in each time frame period. For each time frame, the count value of input cells is compared with a predetermined threshold value. An input cell for which the count value exceeds the threshold value in either one of the time frames is assumed to be an excess cell. The excess cell is discarded or a violation mark is added thereto.

7 Claims, 10 Drawing Sheets

ATM CELL POLICING METHOD AND APPARATUS

This application is a continuation of application Ser. No. 08/013,398, filed on Feb. 4, 1993 now abandoned.

BACKGROUND OF THE INVENTION

The present invention relates to a communication system of an asynchronous transfer mode (to be abbreviated as ATM herebelow), and in particular, to an ATM cell policing method and apparatus disposed in an interface unit between an ATM network and various kinds of terminal units for guaranteeing the communication quality of the network.

In an ATM network, information of various media such as voices, images, and digital data outputted from such information sources as computers, telephone facilities, and video terminal units is transported in the form of fixed-length packets (to be referred to as cells herebelow). Consequently, according to the ATM network, in consideration of features of traffic of information from the sources, communication paths or connections can be multiplexed in a statistical manner.

That is, in a case where the amount of information generated in each information source varies with respect to time, it is necessary in the conventional line exchange network to allocate resources (communication bands) of the network to the respective calls according to the maximum information generating speed of each information source. However, in the ATM network, when a call is received, a communication band used in the network can be allocated thereto in association with an average transmission speed of the pertinent information source or a transmission speed similar thereto.

In order to achieve the statistical multiplex operation above, for an issuance of a call, each information source supplies a control system (for example, an exchange) on the network side with values of such parameters denoting traffic features as the maximum speed of information transmission and/or the average speed thereof. On the network side, according to the parameter values thus notified from the information source, there is computed a transmission capacity to be allocated to the call related to the source. When a call is issued therefrom, the capacity is to be compared with the marginal resource capacity available at the moment, thereby deciding whether or not the call can be accepted. If the call can be accepted, the communication is granted for the information source having issued the request.

Moreover, in the ATM network, whether or not each information source in communication is sending information in conformity with the traffic condition beforehand notified to the control system is determined. If the condition is not satisfied in a communication attempted, a control operation is conducted for the pertinent traffic of cell, for example, the cell not satisfying the condition is discarded so as to guarantee normal communications under the statistical multiplex operation. The function to control the traffic volume is called "policing".

As an example of mode of policing control, there has been known as a T–X method or a Jumping Window method which has been reported, for example, in the 1989 Autumn Conference Report of the IEICE (Institute of Electronics, Information and Communication Engineers) of Japan (B-262).

SUMMARY OF THE INVENTION

It is therefore an object of the present invention to provide a communication apparatus and a policing apparatus capable of improving the utilization efficiency of network resources.

Another object of the present invention is to provide a policing method capable of effectively detecting the burst which occurs in a period of time which astrides two time frames and which has not been detected as a violation case in the prior art.

In order to achieve the objects above, according to one aspect of the present invention, there is provided an input cell policing method for use in a network of an asynchronous transfer mode. The method has the following steps. According to information contained in a header field of each input cell, a group to which the input cell belongs is identified. There are set, for each of the groups, a plurality of time frames having a predetermined length and mutually different phases so as to count the number of input cells in a period of time of each of the time frames. Each of count values of input cells in the respective time frames is compared with a predetermined threshold value. In either one of the time frames, a cell inputted under a condition in which the count value associated therewith exceeds the threshold value is decided as a violation cell or an excess cell. The excess cell is discarded or is subjected to a marking operation to indicate that the cell is to be discarded.

In a policing apparatus according to the present invention, a plurality of counter means are disposed for each call to count the number of received or arrival cells. For the respective counter means to have count periods having mutually different phases, the points of time for resetting the count values thereof are set to be different from each other. When a count value in either one of the counter means exceeds a predetermined threshold value (registered value X) determined according to values of traffic parameters registered for a call setting operation, the system decides that the transmission condition of the cell is not satisfied, namely, the situation is beyond the restriction of the traffic parameter values.

In the above-described policing method according to one aspect of the present invention, input cells are counted in a plurality of judge periods of time having the mutually different phases, a burst exceeding the length X as described in conjunction with the case of cells b1 and b2 shown in FIG. 1 can be detected as a cell series of a wrong or violation traffic by either one of the plural counter means.

Namely, adopting the policing apparatus and method according to the present invention, the worst traffic pattern allowed by the network for each call in the count period of time T is a burst having a length X. Consequently, in accordance with the present invention, the length of the burst entering the network can be minimized to about one half of that of the conventional example, which thereby improves the utilization efficiency of network resources.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
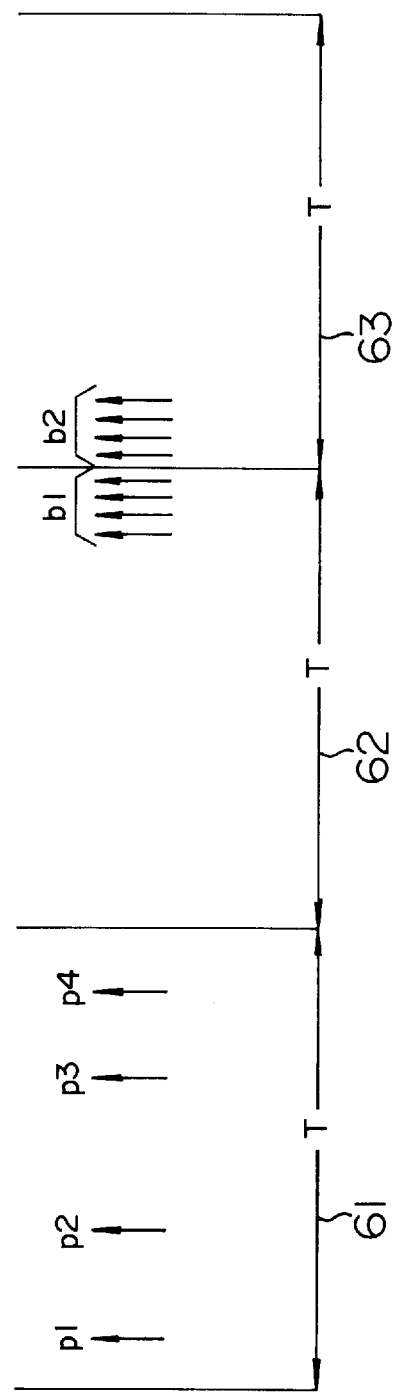
FIG. 1 is a diagram showing cell arrival patterns for explaining a conventional policing method.

For a better understanding of the present invention, reference will first be made to the T–X method described in the IEICE of Japan (B-262) Report, with reference to FIG. 1. According to the T–X method, as shown in FIG. 1, for each predetermined period of time and for each information source (specifically, for each virtual path (VP) and/or a virtual channel (VC)), the number of ATM cells received by the ATM network during the period is counted. When the resultant value of ATM cells from an information source exceeds the value X beforehand registered from the information source, the subsequent cells arriving at the network during the period T are to be discarded. The counter to obtain the number of the cells received by the network is reset at an interval of time T to initiate counting cells in the next period of time T.

Ordinarily, on the network side, when a call is to be established, a transmission capacity to be allocated to the call is computed on assumption of the worst traffic pattern passing the policing control means. In the example of traffic shown in FIG. 1, the worst traffic pattern is developed in a case, as shown in time frames 62 and 63, where a plurality of cells b1 arrive at the network in a burst-like manner in an end portion of a cell counting period (time frame) 62 and then a plurality of cells b2 successively arrive thereat in a first portion of the next time frame 63 in a similar fashion. In other words, according to the conventional policing means of the T–X method, even in a case of the cells b1 and b2 where a burst having a length which is about twice the registered value X arrives at the network in a period of time which astrides two time frames, if the number of cells in each time frame is within the registered value, it is impossible to detect the cell of the long burst as a wrong or violation cell. This leads to an occurrence of the possibly worst traffic pattern.

According to the ATM network, the length of each burst is the parameter most essential to the allocation of transmission capacity to a new call attempted for a communication. In the prior art, also for a traffic related to cells p1 and p2 arriving at the network at random as shown in a time frame 61 of FIG. 1, to cope with an occurrence of the worst case in which 2X cells are received in a burst-like manner, there is allocated a transmission capacity larger than an actually required transmission capacity. Consequently, the transmission capacity allocated to each call exceeds the traffic of the actual call, which may lead to a problem of deterioration of utilization efficiency of the network resources.

Figure 2:
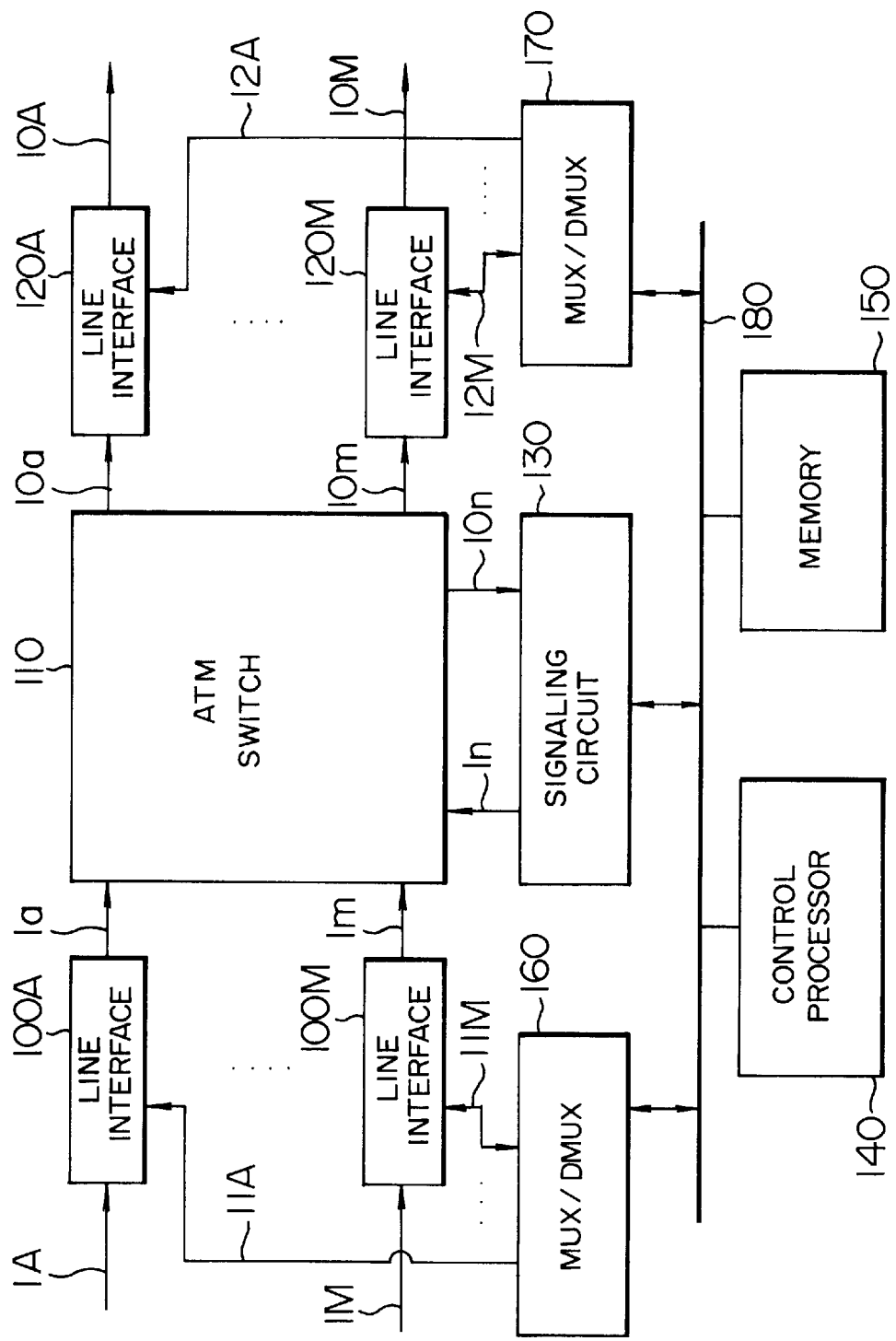
FIG. 2 is a block diagram schematically showing an example of the structure of an ATM exchange to which the policing method and apparatus are applied in accordance with the present invention.

FIG. 2 shows an example of the structure of an ATM exchange to which the present invention is applied. The construction includes input lines 1A to 1M for inputting therefrom ATM cells, output lines 10A to 10M for outputting therefrom ATM cells, input line interface units 100A to 100M respectively disposed for the input lines 1A to 1M, output line interface units 120A to 120M respectively arranged for the output lines 10A to 10M, and an ATM switch 110 for receiving the ATM cells via input ports 1a to 1m through the associated input line interface units 100A to 100M and outputting the cells to output ports 10a to 10m determined as destinations of the respective cells according to routing information contained in a header portion of each cell. Each input line 1J is disposed in association with an output line 10J to be paired therewith and is connected to a terminal unit or another exchange, not shown.

Furthermore, the system includes a signaling circuit 130 for receiving cells for a call control from the switch 110 via the port 10n, assembling the cells into a control message, and passing the message via an internal bus 180 to a control processor 140. Conversely, the signaling circuit 130 receives a control message from the control processor 140 and subdivides the message into a plurality of cells each having a fixed length to supply the cells via the input port 1n to the switch 110.

The control processor 140 achieves a control operation according to a control program prepared in the memory 150 in response to the control message received from the signaling circuit 130. For example, when one of the terminal units linked with the input line 1A issues a call setting request message containing destination information (a dial number of a destination apparatus), the message is divided into a plurality of cells to be delivered to the interface 100A. Adding routing information to the port 1a to the header of each of the cells constituting the message, the interface 100A sends the cells to the switch 110. These cells are assembled into a call setting request message by the signaling circuit 130 to be fed to the control processor 140. On receiving the message, the control processor 140 references a table beforehand loaded in a memory 150 to indicate relationships between destination information items (dial numbers) and the output ports 10a to 10m and thereby outputs to the signaling circuit 130 call setting control information having header information specifying an output port 10i connected to the destination apparatus. As a result, information for setting the call is communicated between the ATM exchange and the destination apparatus. On receiving a response message from the destination apparatus via the signaling circuit 130, the control processor 140 generates a control message containing header information designating the output port coupled with the terminal unit as the message source and then delivers the message to the signaling circuit 130. Through the operation above, a call is established between the terminal unit as the source of call and the call destination unit, namely, there is arranged an environment for communications therebetween.

In the procedure of setting the call, the control processor 140 assigns the call with a virtual path identifier VPI and/or a virtual channel identifier VCI and then sets, via a multiplexer (MUX)/demultiplexer (DMUX), relationships between these identifiers and the output ports to header conversion tables respectively of the interface units 100A and 100I related to the call.

Figure 3:
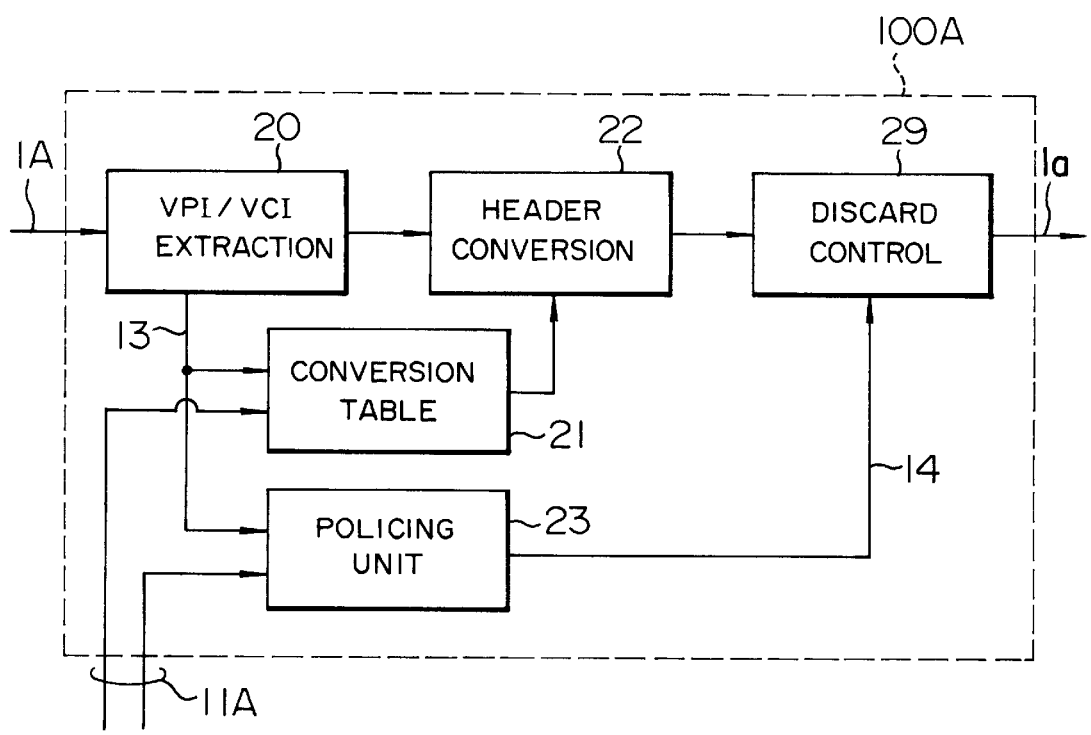
FIG. 3 is a block diagram showing the configuration of a line interface 100 (FIG. 2) including a policing apparatus 23.

FIG. 3 shows the structure of the input line interface 100A.

The configuration includes a circuit 20 for extracting the VPI/VCI contained in the header field of an input cell received from the input line 1A, a header conversion table memory 21 which stores therein an output port identifier for each VCI/CPI such that when information of VCI/CPI is supplied from the extraction circuit 20 via a signal line 13, an output port identifier corresponding thereto is outputted from the table, and a header conversion circuit 22 for adding to the input cell the output identifier (routing information) delivered from the table 21.

The construction of FIG. 3 further includes a policing unit 23 for implementing a policing method according to the present invention, which will be described later, and a cell discard control circuit 29 operative in response to a violation detection signal received from the policing unit 23 via a signal line 14 for marking or discarding wrong or violation cells excessively generated beyond the registered condition.

Figure 4:
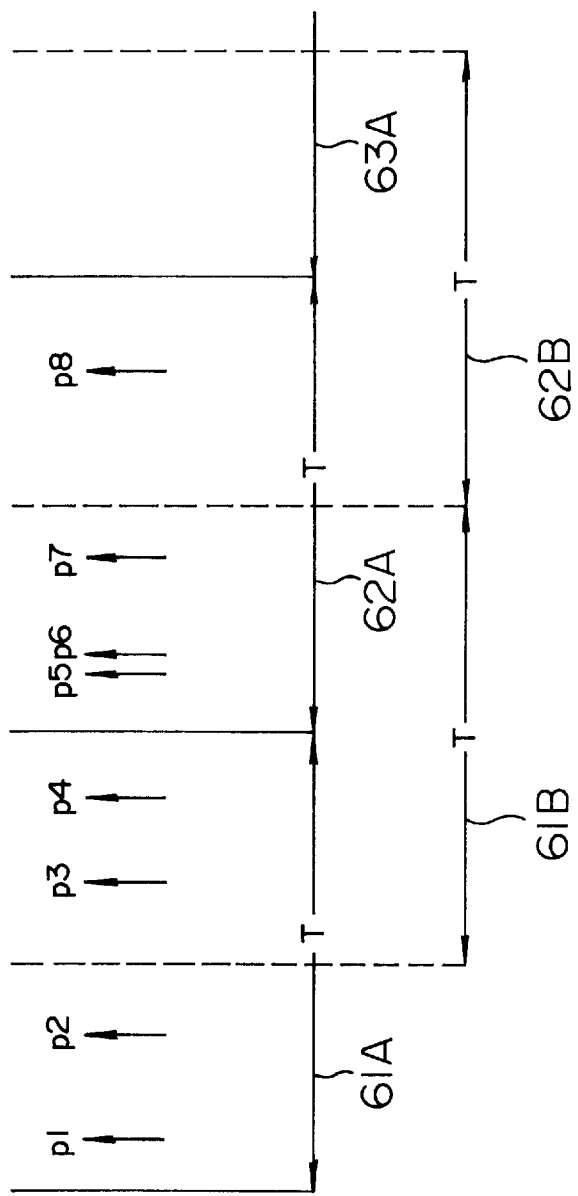
FIG. 4 is a diagram useful to explain the operation related to the policing method in an embodiment according to the present invention.

FIG. 4 shows an embodiment of the policing method achieved by the policing unit 23 according to the present invention. The abscissa stands for time and p1 to p8 denote arrival points of cells belonging to a call. In this example, for each call, there are arranged two counter means A and B for respectively achieving count operations of the cells having arrived at the system during the respective count periods of time T. These count periods of the counter means A and B are shifted in phase from each other by a period of time T/2. In the graph, when the value X allowed for the number of cells granted during a time frame T is, for example, four; cells p3 to p7 arrived in a burst-like manner during a period of time ranging from a last portion of a first time frame 61A to a first portion of a second time frame 62A of the counter means A are assumed by the counter means B as appropriate cells which conform to the registered values, respectively. However, in the counter means B, the cells p3 to p7 arrive thereat within a time frame 61B and hence the count value exceeds the threshold value X, thereby detecting that the cells are transmitted beyond the limitation of the registered values. The discard control circuit 29 accordingly operates to discard the cell p7 for which the threshold value X is exceeded.

Figure 5:
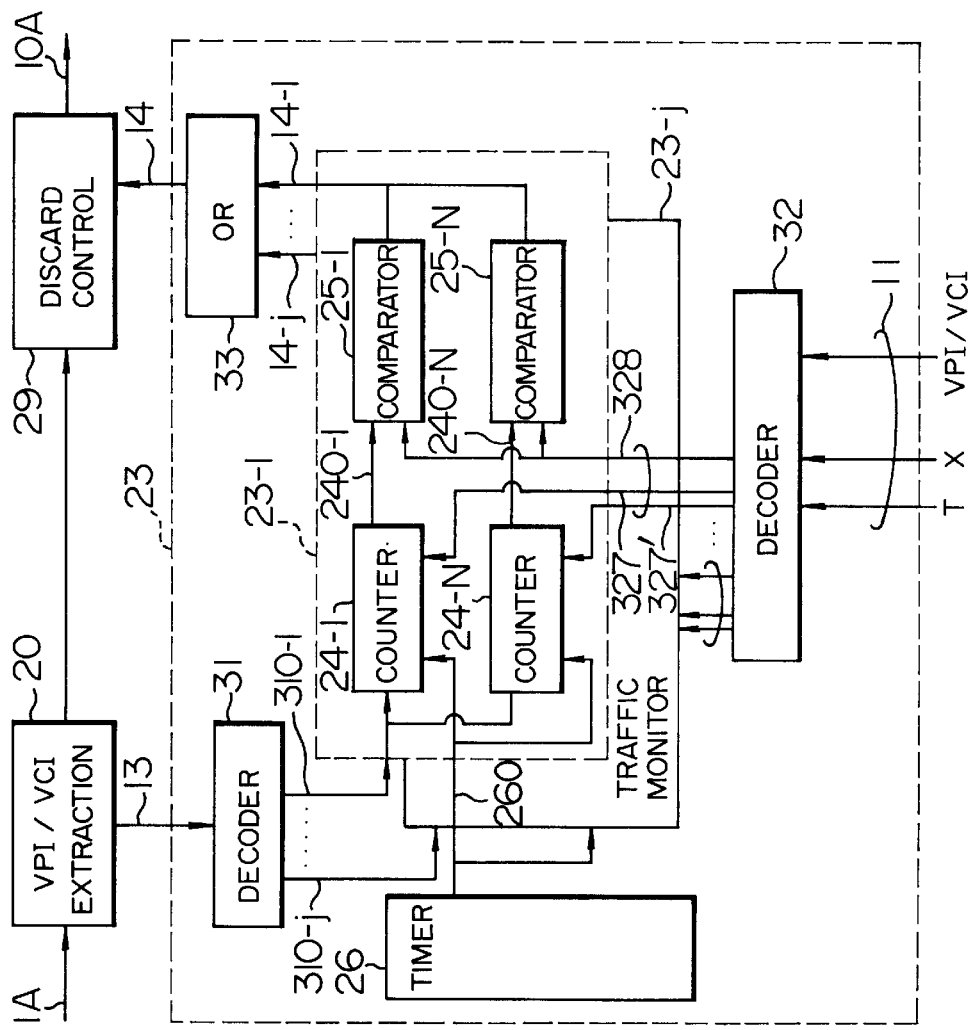
FIG. 5 is a block diagram showing the constitution of the policing apparatus 23 in an embodiment implementing the policing operation of FIG. 4 according to the present invention.

FIG. 5 shows an example of the structure of the policing unit 23 realizing the policing method described above. For simplification of the diagram, the circuit elements for the header conversion shown in FIG. 3 are omitted in FIG. 5. The policing unit 23 according to the present invention includes a plurality of traffic monitor blocks 23-1 to 23-$j$ disposed in association with the VPIs and/or VCIs and a timer 26.

Reference numeral 31 denotes a decoder for receiving a value outputted from the VPI/VCI extraction circuit 20 to indicate a virtual identifier VPI and/or a virtual channel identifier VCI of an input cell and selectively supplying an associated one of the count pulses 310-1 to 310-$j$ to a traffic monitor block 23-$i$ corresponding to the received value. A numeral 32 designates a decoder for receiving control parameters (the count period T and the threshold value X) supplied from the control processor 140 in a call setting operation via a signal line (or a bus) and distributing the parameters to a traffic monitor block 23-$i$ specified by the VPI/VCI. A reference numeral 33 indicates an OR circuit for ORing the decision signals from the respective traffic monitor blocks 23-1 to 23-N to supply the resultant value as a decision output of the policing unit 23 to the cell discard control circuit 29.

Each of the traffic monitor blocks 23-1 to 23-$j$ includes N counter units 24-1 to 24-N and N comparators 25-1 to 25-N (N=2 in the example of FIG. 5) associated with the counter units. The timer 26 measures elapse of time and is reset (to an initial value) at a fixed interval of time.

Figure 6:
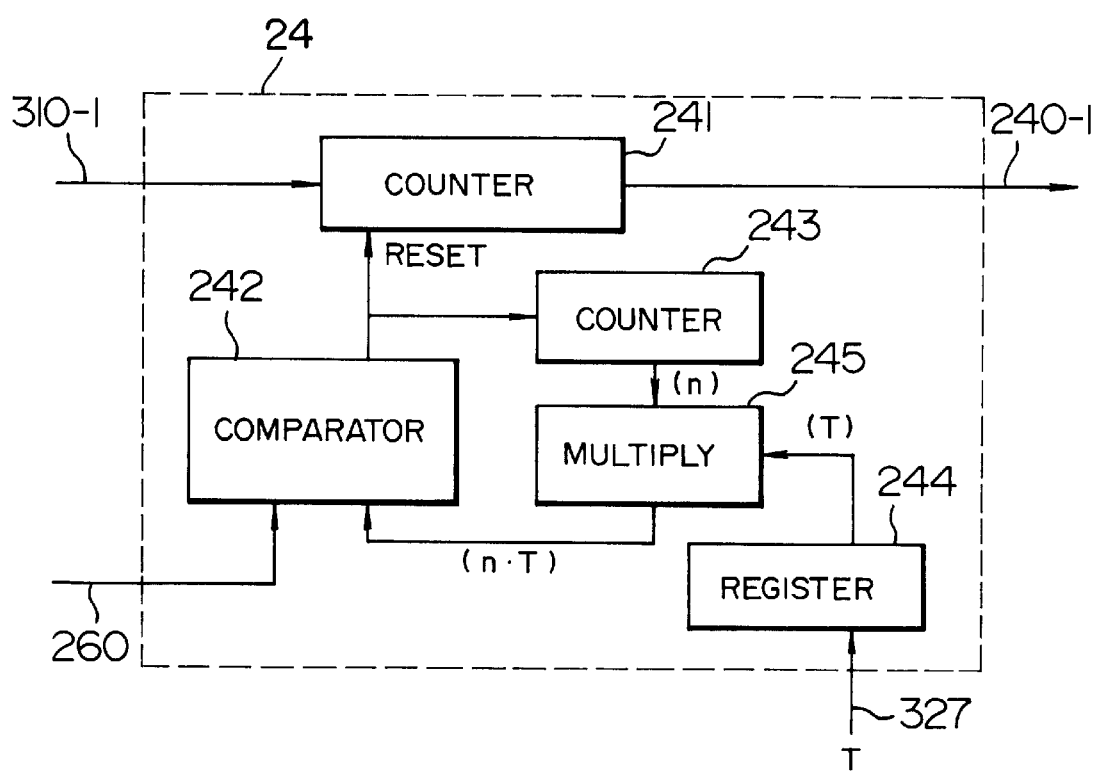
FIG. 6 is a diagram showing an example of the construction of a counter 24 of FIG. 5.

The counter unit 24-1 includes, as shown in FIG. 6 by way of example, a first counter 241 for counting the count pulse 310-1, a comparator 242 for resetting the first counter 241, a second counter 243 for counting a reset pulse outputted from the comparator 242, a register 244 for storing therein a value T denoting a count period of time supplied from the decoder 32, and a multiplier 245 for producing a product T·n between the value T set in the decoder 32 and the count value n of the second counter 243.

The comparator 242 compares the value t of the current time supplied from a timer 26 via a signal line 260 with the value T·n outputted from the multiplier 245. When t≧T·n results, a reset pulse (RESET) is outputted. In consequence, thanks to the resetting operation of the counter value of the first counter 241 by the reset pulse (RESET), the number of cells arrived at the system in the time frames 61A, 62A, 63A, etc. of FIG. 4 each having the period of time T can be counted for each of the frame by the first counter 24.

The counter unit 24-N is configured in the same manner as for the counter unit 24-1. However, when the period of time T is set via a signal line 327' to the unit 24-N with the phase thereof being shifted from that of the unit 24-1 (in a case of N=2, a shift of T/2 is disposed therebetween), the number of arrival cells can be counted for each of the time frames 61B, 62B, etc. of FIG. 4.

The count values of input cells respectively obtained by the counters 24-1 and 24-N are respectively inputted to the comparators 25-1 and 25-N to be compared with the threshold value X. If "true", is developed as a result of the comparison in either one of the comparators, namely, if either one of the input cell count values exceeds the threshold value X, a signal 14-1 is sent to the control circuit 29 to discard the input ATM cell at the point of time.

In accordance with the configuration of the embodiment, there is provided a traffic monitor. Namely, for each call, there are arranged a plurality of counters respectively having count periods of time with a phase difference therebetween. The system includes a plurality of comparators for comparing the count values of the respective counters with the threshold X. The resultant outputs from the comparators is ORed to produce a logical sum thereof. As a result, when any burst exceeding the registered value occurs in any phase, the traffic monitor detects the burst in any situation.

In this regard, according to the constitution, the value of the count period T may vary between the calls. In the embodiment, the number of input cells is counted by the plural counter units 24-1 to 24-N such that the respective count values are compared with the threshold value X by the comparators 25-1 to 25-N, respectively. However, the circuit may be configured such that the counter areas for the respective VPIs and/or VCIs are allocated in a memory. Namely, each time a cell is inputted, "one" is added to the value of count data in the pertinent memory area. Furthermore, in the constitution of the embodiment, the VPI/VCI is extracted from the header of the input cell by the circuit 20. However, the system may be structured such that a copy of the input cell is supplied to the decoder 31 so that the decoder 31 analyzes the header to generate the pulses 321-1 to 321-$j$. Alternatively, the copy of the input cell may be sent to the selected traffic monitor block 23-$i$ to be counted by the counter unit. Namely, the configuration may be appropriately modified, for example, as above.

Figure 7:
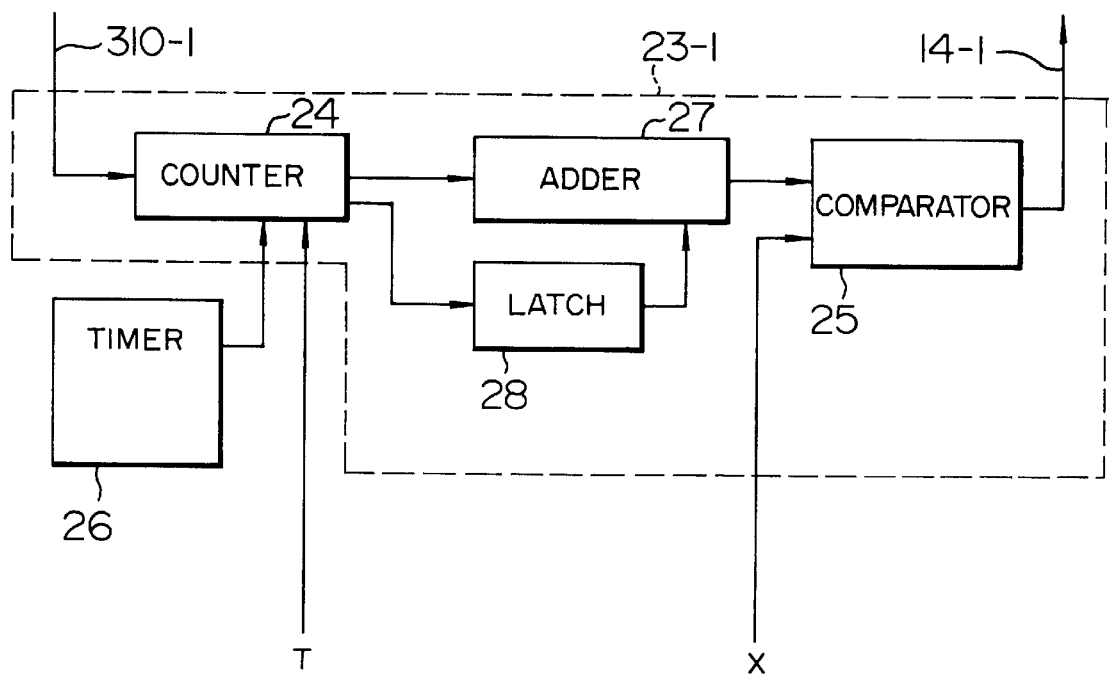
FIG. 7 is a block diagram showing the configuration of the policing apparatus in another embodiment according to the present invention.

FIG. 7 shows the construction of the policing unit 23-1 in a simplified form in another embodiment according to the present invention.

In this structure, a counter unit 24 is responsive, like the counter unit 24-1 shown in FIG. 5, to a setting value of a period T of time supplied from the control processor 140 to count the number of input cells for each predetermined period of time. In this situation, the unit 24 measures the number of input cells during a period T/2 of time by an internal counter. The count of the internal counter is incremented each time a cell is inputted to the system and the count value obtained therefrom is fed to an adder circuit 27. In addition, each time the internal counter is reset (in an interval of of time T/2), the value thereof is fed to a latch circuit 28. The adder 27 adds the count value of input cells counted in a period T/2 by the counter 24 to that of input cells in a period T/2 immediately before the operation is achieved by the latch 28, thereby obtaining the number of input cells in the latest period T. The result of addition is compared with the threshold value X by a comparator 25. If the count value of the input cells is larger than the threshold value, a cell discard indication signal 14-1 is outputted from the comparator 25.

According to the structure of the embodiment, thanks to the latch circuit 28 and the adder circuit 27, burst cells such as the cells p2 to p7 of FIG. 4 can be advantageously detected by a simple constitution including a set of a counter unit and a comparator.

Figure 8:
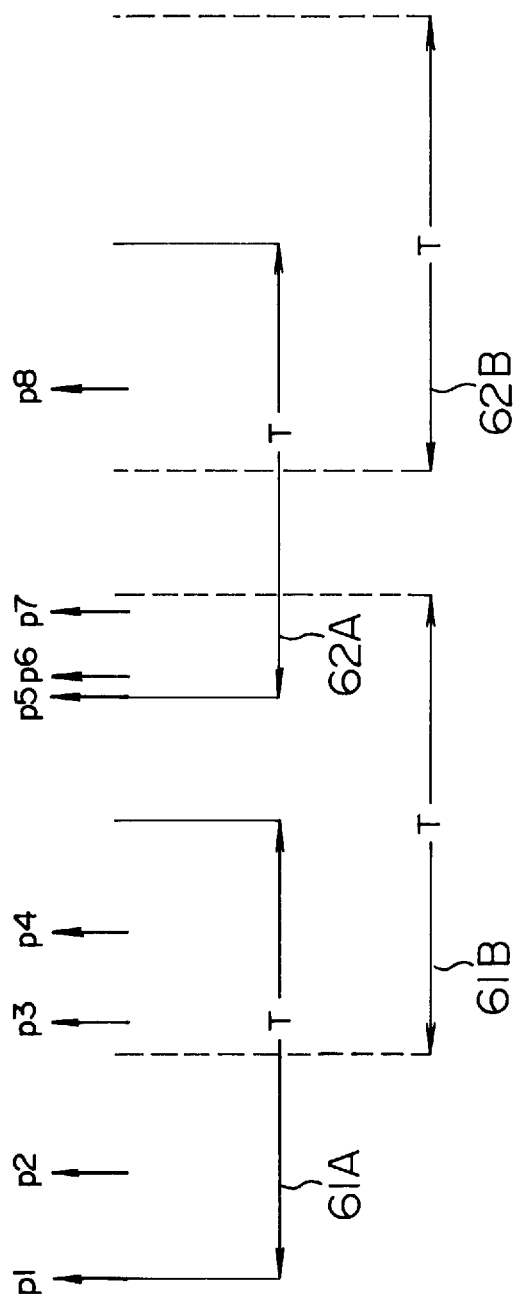
FIG. 8 is a diagram useful to explain the operation related to the policing method in the other embodiment according to the present invention.

FIG. 8 shows another embodiment of the policing method according to the present invention. Like in the case of FIG. 4, the abscissa denotes time to present count periods of time and distribution of input cells along the lapse of time.

In this embodiment, each time frame is initiated at a timing synchronized with a cell input timing. For example, when a cell p1 is received, a time frame 61A of counter means A is started to count the number of cells arriving at the system in this time frame. On the other hand, counter means initiates a time frame 61B corresponding to the time frame 61A at a timing delayed by a period of time T/2 relative to the start of each time frame (the arrival point of time of the cell p1 in this example) of the counter means A, thereby counting the number of input cells in the time frame 61B. When the count value of input cells exceeds the associated threshold value in either one of the time frames, a signal is created to indicate discard of the input cell. In this regard, when there are disposed N counter means (N≧3), the starting point of time frame need only be sequentially shifted by T/N for each counter means.

Figure 9:
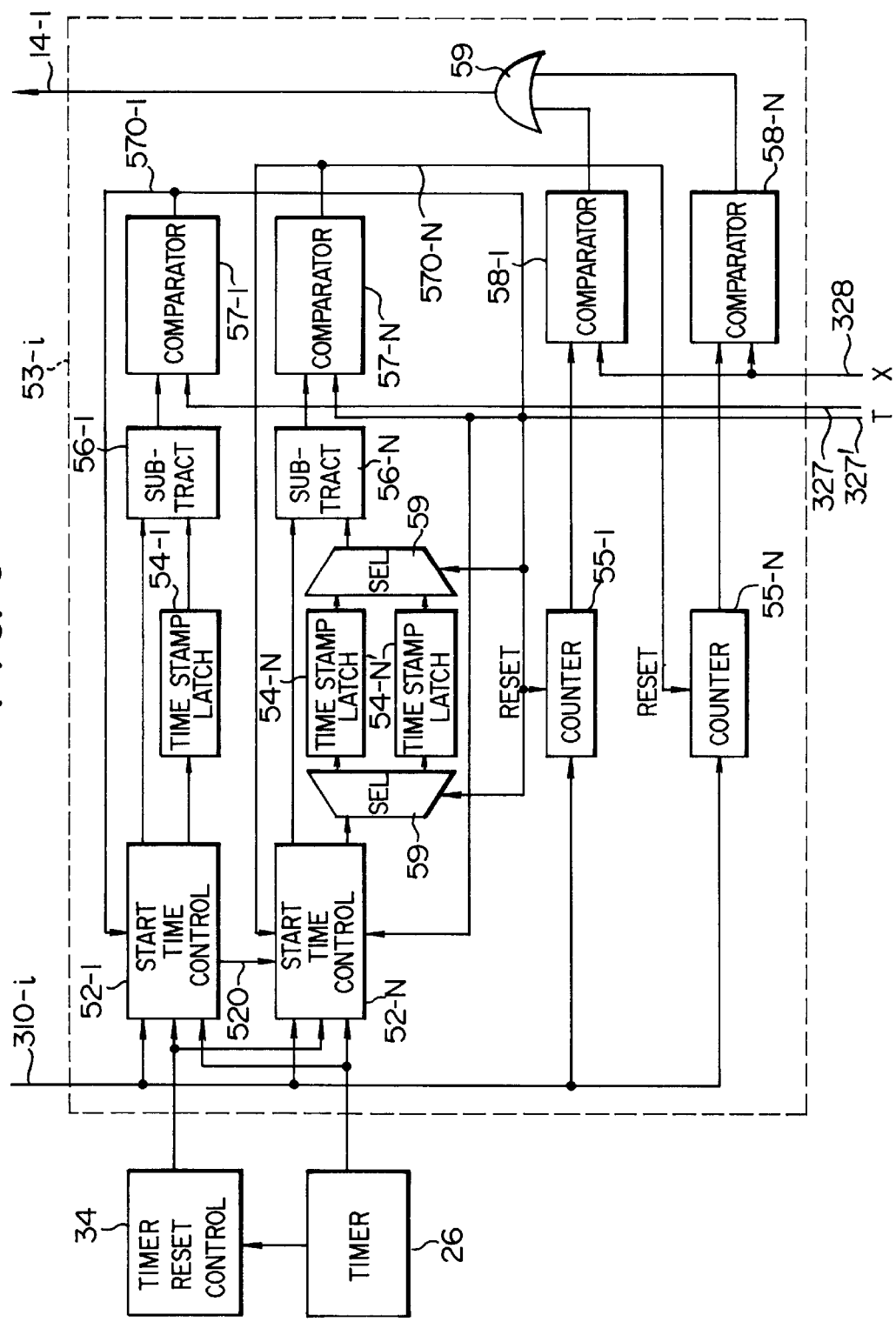
FIG. 9 is a diagram showing the constitution of the policing apparatus in a further embodiment developing the operation of FIG. 8 according to the present invention.

FIG. 9 shows an embodiment of the policing unit according to the present invention for implementing the policing method of FIG. 8. This diagram shows one of the plural traffic monitor blocks arranged in association with the calls, namely, a traffic monitor block 53-$i$.

In this diagram, counters 55-1 to 55-N are reset respectively by comparators 57-1 to 57-N at mutually different timings. Each counter counts the number of input cells (count pulses 310-$i$) received in the period T associated therewith. Reference numerals 58-1 to 58-N denote comparators for comparing the count values respectively of the counters 55-1 to 55-N with the threshold value X. Each comparator produces a cell discard signal when the count value exceeds the threshold value X. Numeral 59 stands for an OR circuit for generating a logical sum of the outputs from the comparators 58-1 to 58-N. In the embodiment, the counters 55-1 to 55-N are reset by the following circuit constitution employing a time stamp.

In this circuit structure, reference numerals 52-1 to 52-N designates start time control circuits for controlling initiation timings of the time frames, respectively.

After a reset signal 570-1 is received from the comparator 57-1, when a first cell is received, the circuit 52-1 sets as a reference time a value of the point of time indicated by the timer 26 to a time stamp latch circuit 54-1 and sends a timing signal 520 to the circuit 52-N. Thereafter, until the next reset signal is received from the comparator 57-1, the circuit 52-1 successively supplies a subtractor circuit 56-1 with the value of (current) time received from the timer 26.

The circuit 56-1 computes a difference between the reference time set to the circuit 54-1 and the current time fed from the control circuit 52-1 to deliver the difference of time to the comparator 57-1. The comparator 57-1 compares the output value from the subtractor 56-1 with the value T set as the parameter of the count period. When the output value exceeds the value T, namely, when a period of time T is elapsed from the reference time, a reset signal 570-1 is sent to the counter 55-1 and the control circuit 52-1. On receiving the reset signal 570-1, the circuit 52-1 stops supplying the current time to the subtractor 56-1 and then repeatedly conducts outputting the reference time, the timing signal, and the current time when a first cell is received. Resultantly, the counter 55-1 counts the number of input cells in the time frames 61A, 62A, etc. of FIG. 8.

On the other hand, the control circuit 52-N loaded with the value T of the count period setting parameter supplied via a signal line 327' sets as a reference time, when the period of time T/2 is elapsed after a timing signal 520 is received from the circuit 52-1, a value of time indicated by the timer 26 to a time stamp latch circuit 54-N or 54-N'. Thereafter, the current time received from the timer 26 is sequentially supplied to a subtractor circuit 56-N.

The subtractor 56-N produces a difference of time between the reference time stored in the latch 54-N or 54-N' selected by a selector 59' and each value of current time sequentially outputted from the control circuit 52-N to supply the difference of time to the comparator 57-N. If the difference exceeds the setting value T, a reset signal 570-N is produced by the comparator 57-N to be sent to the counter 55-N and the control circuit 52-N.

Since the latch 54-N or 54-N' is loaded with the reference time delayed by T/2 relative to that of the latch 54-1, the counter 55-N counts the number of input cells in the time frames 61B, 62B, and so forth of FIG. 8. When either one of the count values respectively of the counter 55-1 to 55-N exceeds the preset threshold value X, the input cells are discarded by the discard control circuit 29.

In the embodiment, the values of start time respectively of the time frames 61B, 62B, etc. of the counter 55-N are delayed by T/2 respectively from those of the time frames 61A, 62A, etc. of the counter 55-1. However, it may also be possible to employ the cell input signal 310 in the start time control circuit 52-N to match the values of start time respectively of the time frames 61B, 62B, etc. with the cell arrival time.

Moreover, according to the embodiment, the selectors 59 and 59' controlled by the reset signal 570-1 from the comparator 570-1 are adopted to select the time stamp latch circuit 54-N or 54-N'. However, inherently, there need only one time stamp latch circuit.

Figure 10:
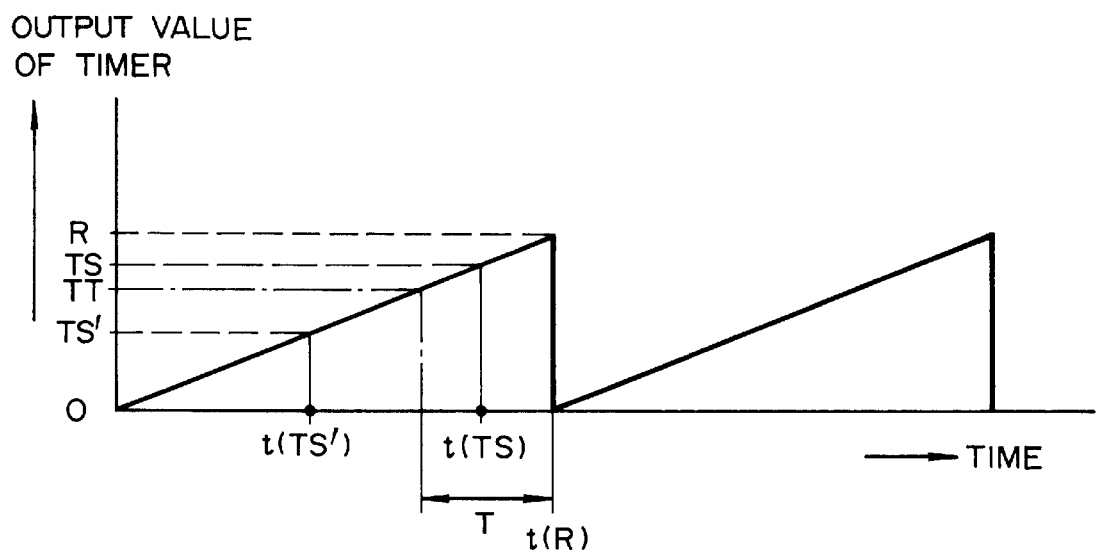
FIG. 10 is a diagram for explaining the time stamp control in a timer reset operation.

FIG. 10 is a graph showing output signals from the timer 26. In general, a timer is configured to count a finite or limited period of time. Namely, as shown by a saw-tooth waveform in FIG. 10, the timer output value is associated with a discontinuity. Specifically, in the count operation of time, when the output from the timer reaches a maximum value R, the output is returned to an initial value. Assume that a period of time in which the output from the timer is changed from the initial value to the maximum value (namely, a timer reset time) is sufficiently greater than the period of time T of each time frame. When the current point of time approaches the reset time t(R), if the point to set the reference time to the time stamp latch is before the reset time t(R) by at least one time frame T, for example, as indicated by t(TS'), the output from the subtractor circuit has continuity. If the point of time to set the reference time is within one time frame of the reset time t(R) like in the case of the point t(TS), the output from the subtractor circuit is attended with discontinuity and hence there cannot be attained an appropriate decision result.

In the embodiment of FIG. 9, a reference numeral 34 denotes a timer reset control circuit to obtain an appropriate result of the comparison achieved by each of the subtractors 56-1 to 56-N between the reference time and the current time in the domain of discontinuity of timer output value.

In a case when the output value (time stamp value) from the timer 26 enters a time region in which the output value exceeds a value TT to be outputted from the timer 26 at a point of time preceding the timer reset time t(R) by a period of time T, the control circuit 34 achieves a control operation as follows. For the start time control circuit 52 using a time stamp as a reference time in this time region, the reference time TS and the time stamp values take corrected values, for example, —(R—TS).

As can be appreciated from the description of the embodiments, according to the policing method and apparatus in accordance with the present invention, it is possible to improve the capability of detecting a burst of input cells, thereby leading to an advantage of the efficient use of the network.

While particular embodiments of the invention have been shown and described, it will be obvious to those skilled in the art that various changes and modifications may be made without departing from the present invention in its broader aspects.

We claim:

1. An input cell policing method for use in a network of an asynchronous transfer mode, comprising the steps of:

identifying, according to information contained in a header field of each input cell, one of a plurality of groups of cells to which the input cell belongs;

setting, for each of the groups, respectively monitor periods having substantially the same predetermined length and mutually different phases from each other and counting the number of input cells in each of the monitor periods;

comparing an accumulated value obtained by adding a count value of input cells in a current monitor period to a count value of input cells in a past monitor period consecutive in time to the current monitor period with a predetermined threshold value; and processing as an excess cell a cell inputted under a condition in which the accumulated value associated therewith exceeds the threshold value as a result of the comparison.

2. A method according to claim 1, further including the step of discarding the excess cell or the step of marking the cell for indicating the cell as an object of discard operation.

3. An input cell policing apparatus for use in a network of an asynchronous transfer mode, comprising:

means for identifying, according to information contained in a header field of each input cell, one of a plurality of groups of cells to which the input cell belongs;

a plurality of traffic monitor means disposed for the respective groups for detecting a violation input cell; and means for receiving a violation detection signal from either one of the traffic monitor means and processing as an excess cell an input cell associated with the signal, wherein each of the traffic monitor means includes:

counter means for measuring the number of input cells belonging to the group identified by the identifying means in each of predetermined measuring periods having substantially the same length and different in phase from each other respectively associated therewith, means for storing therein a cell count value counted by the counter means in at least one of the past measuring periods, and comparing means for comparing a value resultant from an addition conducted between the past count value stored in the store means and a current count value counted by the counter means with a predetermined threshold value and outputting a violation detection signal when the value exceeds the threshold value.

4. An input cell policing method for use in a network of an asynchronous transfer mode, comprising the steps of:

identifying, according to information contained in a header field of each input cell, one of a plurality of groups of cells to which the input cell belongs;

setting, for each of the groups, respectively a predetermined number of monitor periods having substantially the same predetermined length and different in phase from each other and counting the number of input cells in each of the monitor periods, the number of said monitor periods being independent of the length of the monitor periods;

comparing an accumulated value obtained by adding a count value of input cells in a current monitor period to a count value of input cells in a past monitor period consecutive in time to the current monitor period with a predetermined threshold value; and processing as an excess cell a cell inputted under a condition in which the accumulated value associated therewith exceeds the threshold value as a result of the comparison.

5. An input cell policing apparatus for use in a network of an asynchronous transfer mode, comprising:

means for identifying, according to information contained in a header field of each input cell, one of a plurality of groups of cells to which the input cell belongs;

a plurality of traffic monitor means disposed for the respective groups for detecting a violation input cell; and means for receiving a violation detection signal from either one of the traffic monitor means and processing as an excess cell an input cell associated with the signal, wherein each of the traffic monitor means includes:

counter means for measuring the number of input cells belonging to the group identified by the identifying means in each, of predetermined measuring periods having substantially the same length and different in phase from each other respectively associated therewith, the number of said measuring periods being independent of the length of the measuring periods, means for storing therein a cell count value counted by the counter means in at least one of the past measuring periods, and comparing means for comparing a value resultant from an addition conducted between the past count value stored in the store means and a current count value counted by the counter means with a predetermined threshold value and outputting a violation detection signal when the value exceeds the threshold value.

6. An input cell policing method for use in a network of an asynchronous transfer mode, comprising the steps of:

identifying, according to information contained in a header field of each input cell, one of a plurality of groups of cells to which the input cell belongs;

setting, for each of the groups, respectively two monitor periods having substantially the same predetermined length T and different in phase T/2 from each other and counting the number of input cells in each of the two monitor periods;

comparing an accumulated value obtained by adding a count value of input cells in one of the two monitor periods to a count value of input cells in the other of the two monitor periods consecutive in time to the one monitor period with a predetermined threshold value; and processing as an excess cell a cell inputted under a condition in which the accumulated value associated therewith exceeds the threshold value as a result of the comparison.

7. An input cell policing apparatus for use in a network of an asynchronous transfer mode, comprising:

means for identifying, according to information contained in a header field of each input cell, one of a plurality of groups of cells to which the input cell belongs;

a plurality of traffic monitor means disposed for the respective groups for detecting a violation input cell; and means for receiving a violation detection signal from either one of the traffic monitor means and processing as an excess cell an input cell associated with the signal, wherein each of the traffic monitor means includes:

counter means for measuring the number of input cells belonging to the group identified by the identifying means in each of two predetermined measuring periods having substantially the same length T and different in phase T/2 from each other respectively associated therewith, means for storing therein a cell count value counted by the counter means in one of the two predetermined measuring periods, and comparing means for comparing a value resultant from an addition conducted between the count value of the one predetermined measuring period stored in the store means and a count value of the other of the two predetermined measuring periods counted by the counter means with a predetermined threshold value and outputting a violation detection signal when the value exceeds the threshold value.

\* \* \* \* \*